United States Patent
Hsu

(10) Patent No.: US 12,297,944 B1
(45) Date of Patent: May 13, 2025

(54) PIPE COUPLER WITH LOCKING STRUCTURE

(71) Applicant: FOSITEK CORPORATION, New Taipei (TW)

(72) Inventor: An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/640,149

(22) Filed: Apr. 19, 2024

(30) Foreign Application Priority Data

Mar. 28, 2024  (TW) .................................. 113111858

(51) Int. Cl.
  *F16L 37/107*  (2006.01)
  *F16L 37/248*  (2006.01)
(52) U.S. Cl.
  CPC ........... *F16L 37/107* (2013.01); *F16L 37/248* (2013.01)
(58) Field of Classification Search
  CPC ......... F16L 37/38; F16L 37/10; F16L 37/107; F16L 37/248
  See application file for complete search history.

(56) References Cited

U.S. PATENT DOCUMENTS 2,450,527 A * 10/1948 Smith .................... F16L 37/248
5,087,086 A * 2/1992 Snedeker ............. F16L 37/107
2009/0322076 A1 * 12/2009 Tiberghien ............ F16L 37/248
2015/0276110 A1 * 10/2015 Parekh .................. F16L 37/107
2016/0010777 A1    1/2016 Cheon et al.
2016/0040814 A1    2/2016 Jung et al.
2022/0089301 A1 *  3/2022 Gregory ................ F16L 37/107

FOREIGN PATENT DOCUMENTS

TW    M657880 U    7/2024
WO   2022251878 A1  12/2022

OTHER PUBLICATIONS

Search Report dated Nov. 14, 2024 issued by Taiwan Intellectual Property Office for counterpart application No. 113111858.

* cited by examiner

*Primary Examiner* — Zachary T Dragicevich
(74) *Attorney, Agent, or Firm* — Demian K. Jackson; Jackson IPG PLLC

(57) ABSTRACT

A pipe coupler with locking structure includes male and female parts connected end-to-end. The male part includes a male coupler body provided with at least one groove, a spring fitted on the male coupler body with an end fixed thereto, and a sleeve enclosing the male coupler body and the spring therein with another end of the spring fixed thereto. A retaining member is connected at an end to the sleeve with a protruded element provided on a free end thereof to movably engage with to or disengage from the groove on the male coupler body. The female part includes a female coupler body externally provided with at least one slantly extended guiding groove. When the sleeve is rotated, the protruded element is moved in the guiding groove to a closed tail end thereof and the spring is stretched forward to elastically pull the male and female coupler bodies together.

7 Claims, 6 Drawing Sheets

PIPE COUPLER WITH LOCKING STRUCTURE

This application claims the priority benefit of Taiwan patent application number 113111858 filed on Mar. 28, 2024, the disclosure of which is hereby incorporated by reference in its entirety.

FIELD OF THE INVENTION

The present invention relates to a pipe coupler, and more particularly, to a pipe coupler with loose-proof self-locking structure.

BACKGROUND OF THE INVENTION

A quick coupler is often used in liquid or gas conveyance. The currently available quick coupler generally includes a male coupler and a female coupler, which are connected at two opposing rear ends to a pipe respectively and can be quickly connected or disconnected at two facing front ends. And, the current available male and female couplers are basically held to the connected state using retaining steel balls.

However, the quick coupler using the retaining steel balls does not ensure firm connection and has the risk of becoming loosened easily. In the quick coupler using retaining steel ball, a collar on the female coupler presses against steel balls set in the female coupler to retain the steel balls to concaved recesses correspondingly formed on the male coupler. The collar on the female coupler tends to loosen from the female coupler under fierce vibration or impact and no longer presses the steel balls against the concaved recesses on the male couple, leading to separation of the male coupler from the female coupler and accordingly, a loosened quick coupler.

It is therefore tried by the inventor to develop a pipe coupler with locking structure to overcome the problem in the conventional quick coupler as having easily loosened male and female coupler.

SUMMARY OF THE INVENTION

A primary object of the present invention is to overcome the above problem in the prior art by providing an improved pipe coupler with loose-proof self-locking structure, in which a spring is forward stretchable when a sleeve of a male coupler body is rotated to move a retaining member along a slant guiding groove on a female coupler body into a closed tail end of the guiding groove, and a reaction force of the spring enables the male coupler body to be locked to the female coupler body.

To achieve the above and other objects, the pipe coupler of the present invention includes a male part and a female part. The male part includes a male coupler body having a first opening and an opposite first pipe connection opening and internally defining a first passage extending between and communicating with the first opening and the first pipe connection opening. The male coupler body is formed on its outer wall with at least one groove extended from a rim of the first opening toward the first pipe connection opening. A spring is fitted on the male coupler body with an end fixed to the outer wall of the male coupler body. A sleeve encloses the male coupler body and the spring therein and the spring has another end fixed to the sleeve. The sleeve is provided with a through bore and a retaining member corresponding to the groove on the male coupler body. The retaining member has an end fixed to the sleeve and another free end provided with a protruded element, which extends through the through bore of the sleeve into the groove on the male coupler body to be movably engaged with or disengaged from the groove of the male coupler body.

The female part includes a female coupler body having a second opening and an opposite second pipe connection opening, and internally defining a second passage extending between and communicating with the second opening and the second pipe connection opening. The female coupler body is provided on its outer wall with at least one slant guiding groove extended from a rim of the second opening of the female coupler body toward the second pipe connection opening. When coupling the male to the female part, the protruded element at the free end of the retaining member is pushed by the female coupler body to disengage from the groove on the male coupler body. Then the sleeve is rotated for the protruded element to move in and along the guiding groove on the female coupler body to a closed tail end of the guiding groove and be retained thereto. Meanwhile, the spring is brought by the rotating sleeve to elastically stretch forward and generate a stretching force, which pulls the male coupler body toward the female coupler body and locks the protruded element to the closed tail end of the guiding groove.

With the above arrangements of the present invention, the spring on the male part is forward stretchable when the sleeve is rotate, such that the protruded element on the sleeve can move along the guiding groove on the female coupler body into the closed tail end of the guiding groove, enabling the male and the female part to be coupled with each other quickly and effortlessly in a self-locking and loose-proof manner.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
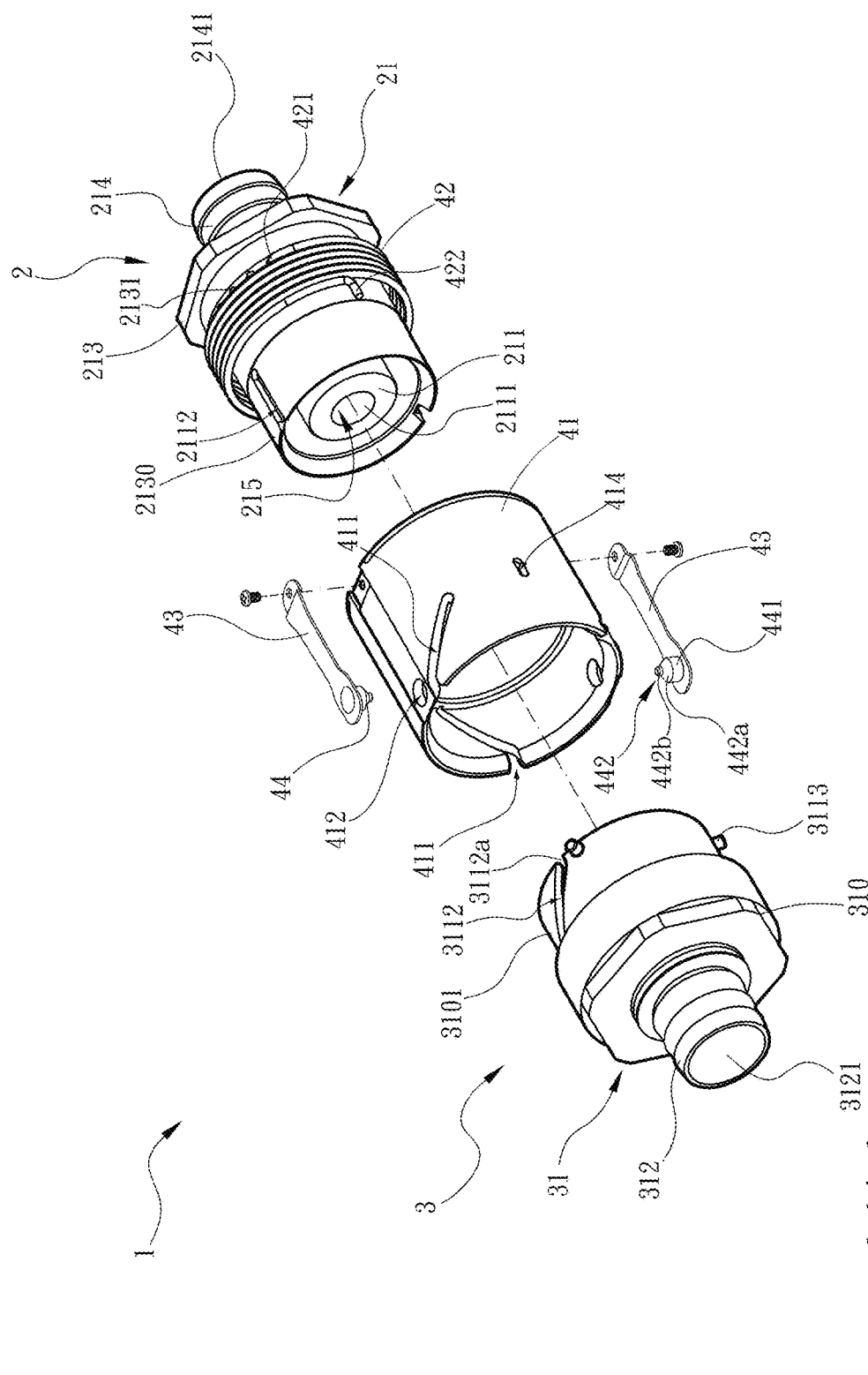
FIG. 1A is a front exploded perspective view of a pipe coupler according to a preferred embodiment of the present invention.

The present invention will now be described with a preferred embodiment thereof.

The present invention provides a pipe coupler with locking structure. For the purpose of conciseness and clarity, the present invention is briefly referred to as the pipe coupler and generally denoted by reference numeral 1 herein. Please refer to FIGS. 1A, 1B and 2A. The pipe coupler 1 is applicable to various pipe or line systems, such as water cooling system, gas line system, or hydraulic system. The pipe coupler 1 of the present invention includes a male part 2 and a female part 3. The male part 2 includes a male coupler body 21, which internally defines a first passage 215 extending through the male coupler body 21 and has a plug section 211, a male coupler seat 213 and a first pipe connector 214 provided thereon. The male coupler seat 213 includes a hollow first tubular section 2130 extended forward from a front end of the male coupler seat 213 and a receiving section 2131 located on the first tubular section 2130. The first passage 215 is located in the first tubular section 2130 and communicable with flow passages in the first pipe connector 214 and the plug section 211.

The first tubular section 2130 of the male coupler body 21 has at least one groove 2112 provided on an outer wall thereof to extend from a rim of the first tubular section 2130 toward the first pipe connector 2141. In the illustrated preferred embodiment, there are two straight grooves 2112 located at two diametrically opposite sides of the first tubular section 2130 extending parallelly relative to the first passage 215. The receiving section 2131 can be a slot, a bore, a cavity, or a hole formed on a middle section of the outer wall of the first tubular section 2130 of the male coupler seat 213 for a spring 42 to connect an end thereto. In the illustrated preferred embodiment, there is shown a plurality of receiving sections 2131 circumferentially spaced on the outer wall of the first tubular section 2130 of the male coupler seat 213. The plug section 211 is located in the first tubular section 2130, and the first pipe connector 214 is located at and outward protruded from a rear end of the male coupler seat 213. The plug section 211 and the first pipe connector 214 respectively have a first opening 2111 and a first pipe connection opening 2141 communicable with the first opening 2111. The first passage 215 is located and extended between and communicable with the first opening 2111 and the first pipe connection opening 2141; and the first pipe connector 214 is provided for a pipe to connect thereto.

Please refer to FIGS. 1A, 1B, and 2A to 2C. The male coupler body 21 has the spring 42 externally fitted thereon. A sleeve 41 in the form of a hollow shell having two open ends encloses the male coupler body 21 and the spring 42 therein. The two open ends of the sleeve 41 are defined as a first end 41a located closer to the male part 2 and a second end 41b located closer to the female part 3. The sleeve 41 has an inner annular section 413 formed in the first end 41a, and a connecting hole 414 provided at a position between the first and the second end 41a, 41b to extend through the sleeve 41 in a thickness direction thereof. With the inner annular section 413, the sleeve 41 is movably fitted on around the male coupler seat 213 of the male coupler body 21, such that the sleeve 41 externally covers the plug section 211 of the male coupler body 21 and the first tubular section 2130 of the male coupler seat 213 and is movable axially and rotatable relative to the male part 2. An inner surface of the sleeve 41 and an outer surface of the male coupler seat 213 together define a receiving space 45 between them, and the above-mentioned spring 42 is located in the receiving space 45 in an elastically compressed state. The sleeve 41 is further provided with at least one guide post groove 411, a through bore 412, and a retaining member 43. The through bore 412 is provided on the sleeve 41 near the second end 41b to penetrate the sleeve in the thickness direction thereof and located corresponding and adjacent to the groove 2112 formed on the male coupler body 21. The guide post groove 411 has a beginning located at the second end 41b and extends obliquely or slantly rearward along an axis of the sleeve 41 to form a slant groove.

The spring 42 can be a torsion spring being fitted on around the first tubular section 2130 of the male coupler seat 213 of the male coupler body 21 and is winding toward the groove 2112. The spring 42 and the male coupler body 21 are simultaneously enclosed in the sleeve 41. The spring 42 has a first connecting end 421 and an opposite second connecting end 422. The first connecting end 421 is selectively fixed (plugged or hooked) to one of the receiving sections 2131, and the second connecting end 422 is fixed, plugged, or hooked to the connecting hole 414 on the sleeve 41. With the first and the second end 421, 422 of the spring 42 being connected to the male coupler body 21 and the sleeve 41, respectively, the spring 42 can be twisted to store a torque. In practical application of the present invention, a user may select suitable one of the receiving sections 2131 for receiving the first end 421 of the spring 42 according to required tightness and speed of coupling the male part 2 to the female part 3 of the pipe coupler 1, so as to adjust the torque or torsional energy that can be stored in the spring 42 and also regulate a stretching force of the spring 42.

Figure 2A:
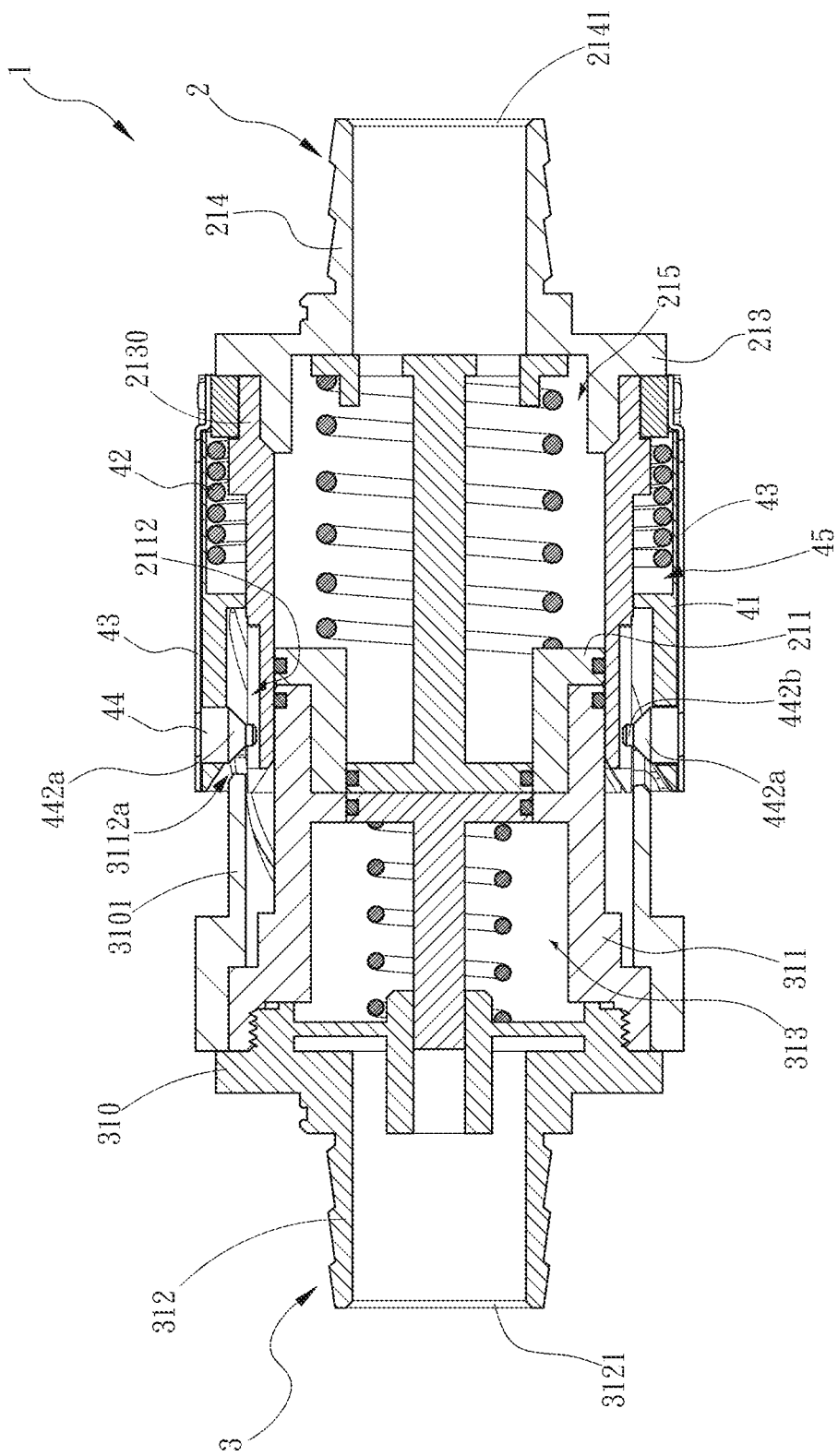
FIG. 2A is a sectional side view showing the pipe coupler of the present invention before the male and the female part are securely coupled together.
Figure 2B:
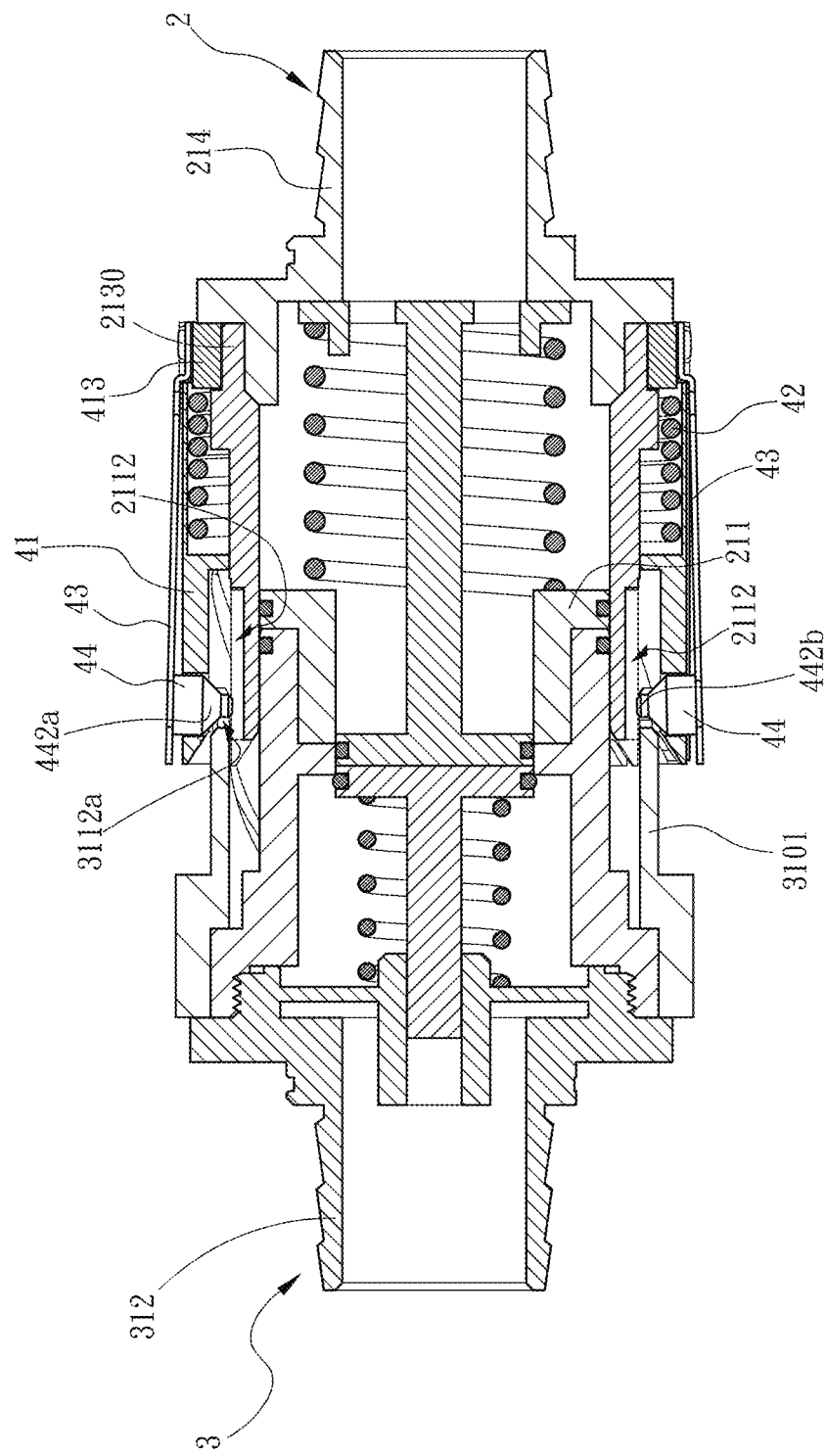
FIG. 2B is a sectional side view showing the pipe coupler of the present invention when the male part starts being moved toward the female part for subsequent coupling.
Figure 2C:
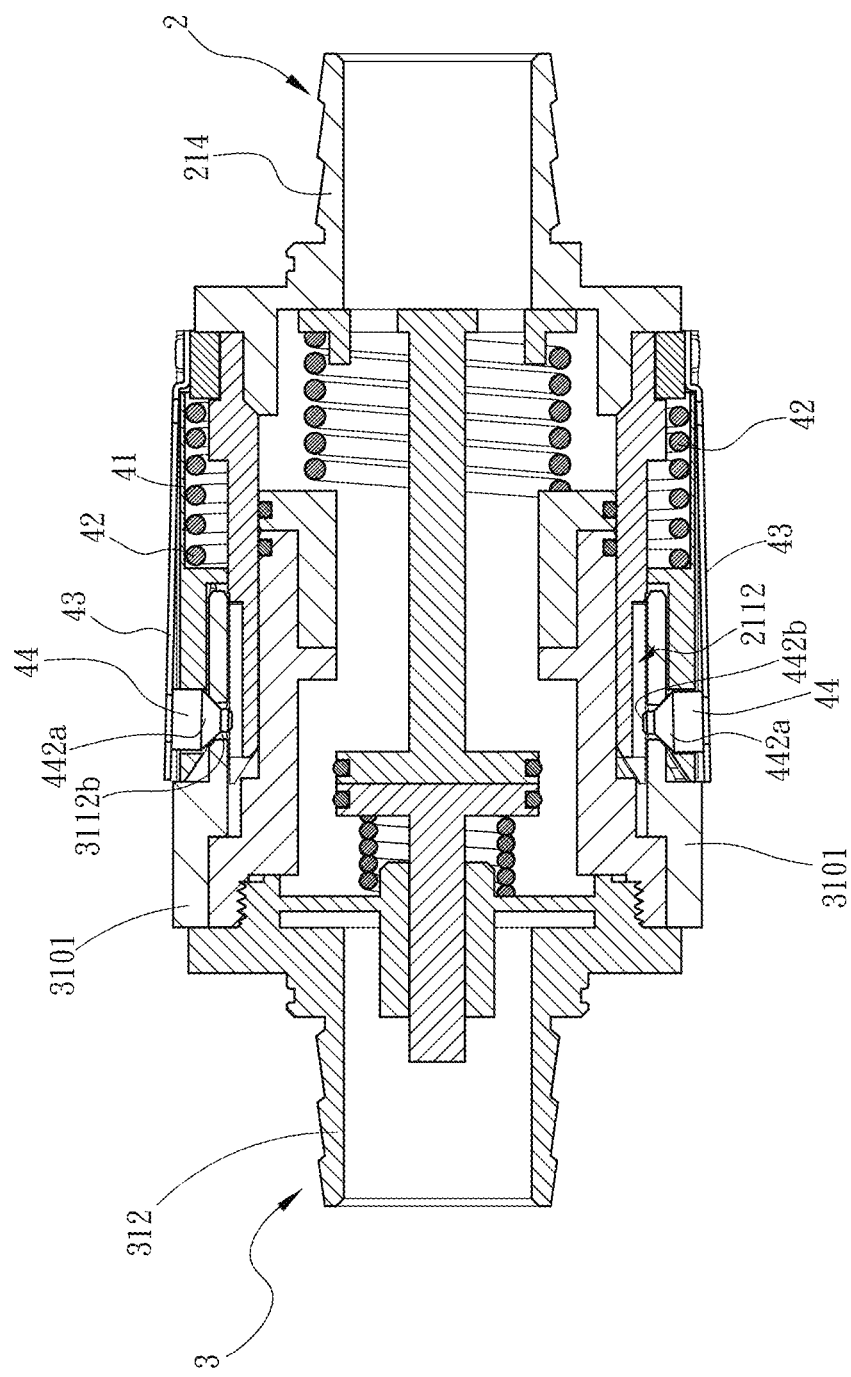
FIG. 2C is a sectional side view showing the pipe coupler of the present invention after the male and the female part are fully coupled together.

The retaining member 43 is in the form of a strip. According to the present invention, there can be a plurality of retaining members 43 provided on the sleeve 41. In the illustrated preferred embodiment, there are shown two retaining members 43 located on an outer surface of the sleeve 41. Each of the retaining members 43 has an end being, for example, screwed to the outer surface of the sleeve 41 near the first end 41a, and another end being a free end and provided with a protruded element 44, which correspondingly extends through the through bore 412 toward the sleeve 41 and is retained to the groove 2112. Specifically, the protruded element 44 has a base portion 441 and a conical guiding portion 442. The base portion 441 is held to the free end of the retaining member 43, and the conical guiding portion 442 has an outer diameter gradually decreased toward the sleeve 41. The conical guiding portion 442 includes a conical surface 442a and a flat butt end 442b; the conical surface 442a is tapered toward the flat butt end 442b. Since the protruded element 44 is located at the free end of the retaining member 43, the protruded element 44 can be lifted when the conical surface 442a is subjected to a push force. On the other hand, the protruded element 44 moves downward to its original position when the push force is removed. Therefore, the flat butt end 442b is movably hooked to or separated from the groove 2112 on the male coupler body 21. For example, please refer to FIGS. 2A to 2C. When the flat butt end 442b of the conical guiding portion 442 originally located in the groove 2112, as shown in FIG. 2A, is pushed by the female part 3 to move upward in the through bore 412 on the sleeve 41, the retaining member 43 is pushed upward simultaneously along with the protruded element 44, as shown in FIG. 2B. Meanwhile, the flat butt end 442b of the protruded element 44 is also pushed by the female part 3 to separate from the groove 2112, as shown in FIG. 2C.

When the flat butt end 442b of the conical guiding section 442 of the protruded element 44 is no longer subjected to any push by the female part 3 of the pipe coupler 1, the retaining member 43 is pushed by the elastic restoring force stored therein to automatically spring to its original position, bringing the flat butt end 442b of the conical guiding section 442 of the protruded element 44 to hook onto and accordingly, connect to the groove 2112, as shown in FIG. 2A.

Figure 3:
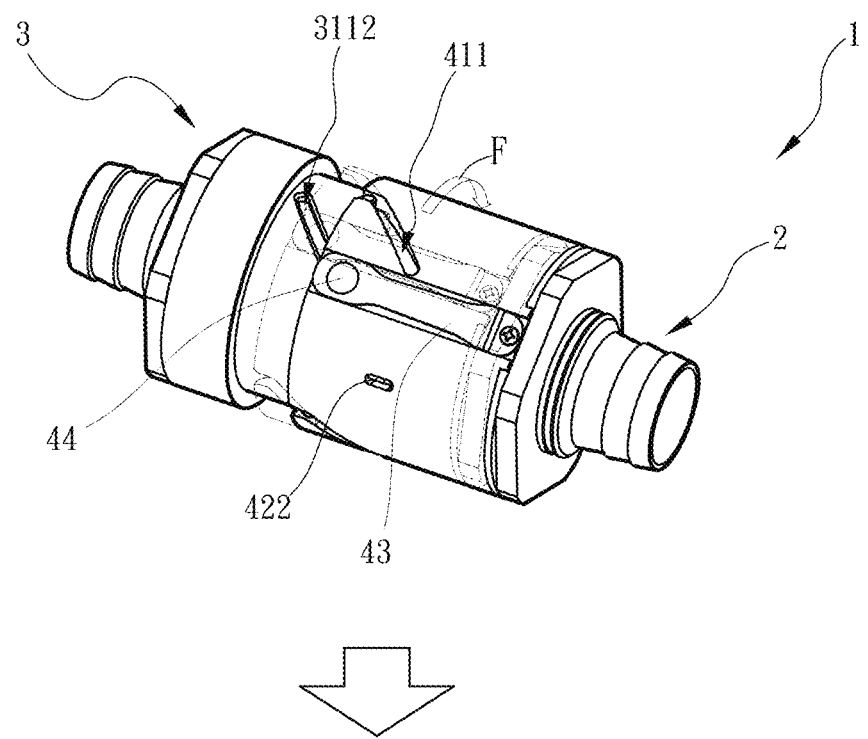
FIG. 3 shows the manner in which a sleeve of the male part of the pipe coupler of the present invention is rotated to engage a protruded element on the sleeve with a guiding groove on the female part.
Figure 3:
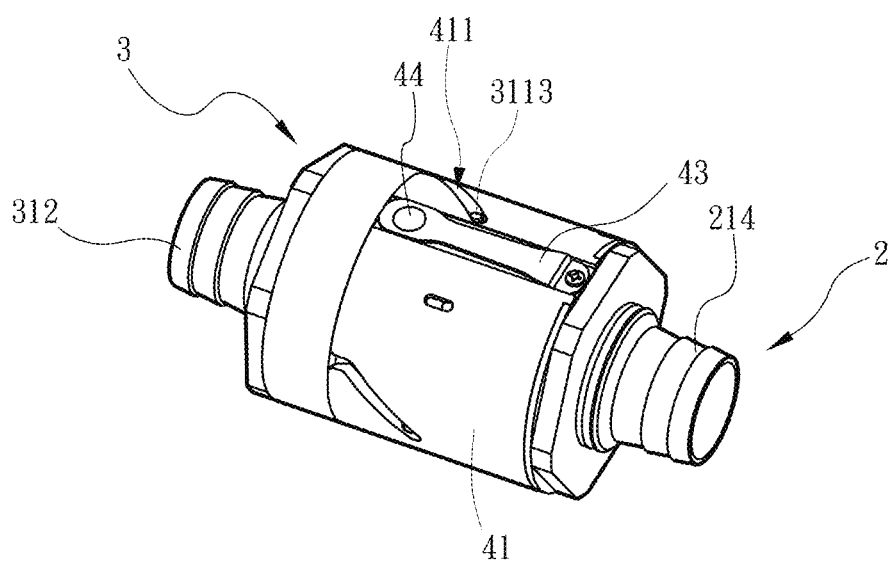

With the above arrangements, the protruded element 44 on the retaining member 43 can be retained to the groove 2112 on the male couple body 21 to maintain the torque stored in the spring 42 when the latter was twisted. Or alternatively, when the protruded element 44 on the retaining member 43 is separated from the groove 2112 on the male coupler body 21 and the sleeve 41 is rotated counterclockwise as indicated by the arrow F, the spring 42 would be pulled forward to generate an axial stretching force, as shown in FIG. 3.

Figure 1B:
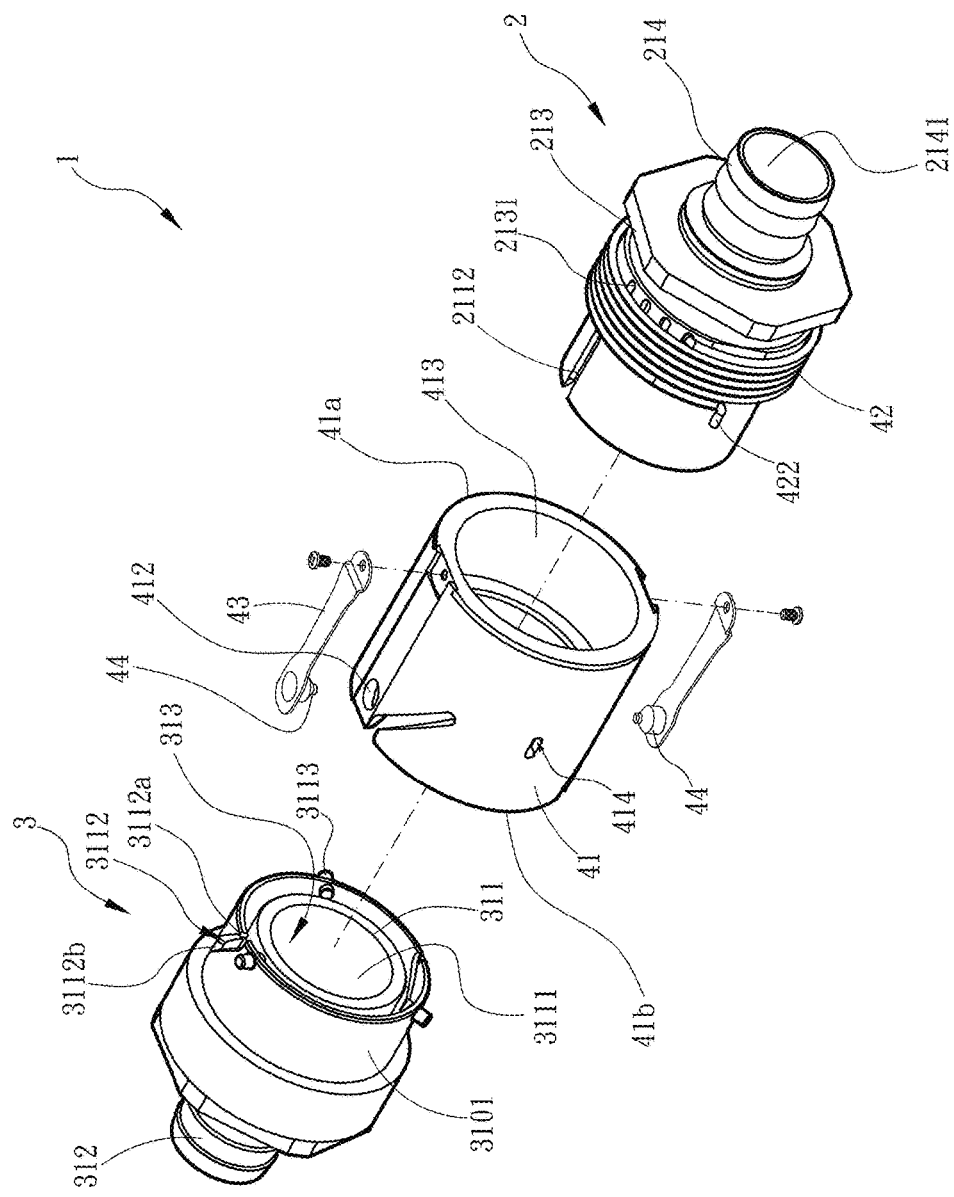
FIG. 1B is a rear exploded perspective view of the pipe coupler of FIG. 1A.

Please refer to FIGS. 1A, 1B and 2A. The female part 3 of the pipe coupler 1 includes a female coupler body 31 internally defining a second passage 313, which extends through the female coupler body 31 between two ends of the female coupler body 31. The female coupler body 31 includes a female coupler seat 310 located at a front end thereof. A second pipe connector 312 extends forward from a front side of the female coupler seat 310 and defines a second pipe connection opening 3121; and an engaging section 311 extends rearward from a rear side of the female coupler seat 310 and is enclosed in a hollow second tubular section 3101. The second passage 313 is located in the engaging section 311 and communicable with a flow passage in the second pipe connector 312.

The second tubular section 3101 of the female coupler body 31 is externally provided with at least one obliquely extended guiding groove 3112 and at least one guide post 3113. The guiding groove 3112 extends from a rim of the second tubular section 3101 toward the second pipe connection opening 3121 obliquely to form a slant groove. According to the present invention, there can be a plurality of guiding grooves 3112 externally provided on the second tubular section 3101. In the illustrated preferred embodiment, there are shown two guiding grooves 3112. Each of the guiding grooves 3112 has a beginning 3112a and a closed tail end 3112b. The beginning 3112a is located adjacent to the rim of the second tubular section 3101 facing toward the male part 2, and is an initial position from where the protruded element 44 of the retaining member 43 on the male coupler body 21 is guided into the guiding groove 3112. The closed tail end 3112b is a final position to where the protruded element 44 of the retaining member 43 can be moved in the guiding groove 3112. The closed tail end 3112b may be selectively formed into a recess or a cavity, to which the protruded element 44 can be locked in place without the risk of unlocking and separating from the second tubular section 3101. The guide posts 3113 are spaced circumferentially on an outer surface of the female coupler body 31 to protrude radially outward therefrom and are correspondingly located adjacent to the guiding grooves 3112 on the female coupler body 31. In the illustrated preferred embodiment, there are shown three guide posts 3113 spaced circumferentially on the outer surface of the second tubular section 3101. The guide posts 3113 on the female coupler body 31 are respectively guided by the guide post grooves 411 on the sleeve 41 to move to the closed tail ends 3112b of the guiding groove 3112 and be locked thereto, so as to facilitate quick alignment, coupling and locking of the male and the female part 2, 3 to each other.

The second tubular section 3101 is fitted on an outer side of the engaging section 311. The engaging section 311 has a second opening 3111, via which the plug section 211 of the male coupler body 21 is plugged into the engaging section 311. The second pipe connector 312 is located at a front end of the female coupler seat 310 to extend forward for another pipe to connect thereto. The second pipe connector 312 defines the second pipe connection opening 3121, which is communicable with the second opening 3111.

Please refer to FIGS. 1A, 2A and 3. When the male and the female part 2, 3 are coupled end to end, the protruded elements 44 and the guide post grooves 411 of the male coupler body 21 are located corresponding to and engaged with the guiding grooves 3112 and the guide posts 3113 of the female coupler body 31, respectively, as shown in FIG. 2A, such that the conical guiding portions 442 of the protruded elements 44 of the male coupler body 21 are subjected to push from the beginnings 3112a of the guiding grooves 3112 of the female coupler body 31 and are forced to a raised position, as shown in FIG. 2B. At this point, the conical surfaces 442a of the conical guiding portion 442 of the protruded elements 44 are abutted on the guiding grooves 3112 of the female coupler body 31. Meanwhile, when the sleeve 41 is rotated counterclockwise as indicated by the arrow F, the spring 42 is caused to move axially and rotate along with the sleeve 41 to thereby be stretched forward, and the conical guiding portions 442 of the protruded elements 44 of the retaining members 43 are also guided to move in the guiding grooves 3112 toward the closed tail ends 3112b, as shown in FIG. 3, such that the guide post grooves 411 on the sleeve 41 rotate along with the sleeve 41 to guide the guide posts 3113 of the female coupler body 31 to move into the guide post grooves 411 of the male coupler body 21. Then, the guide posts 3113 of the female coupler body 31 are brought by a rotating force of the sleeve 41 to drive the female coupler body 31 to move toward and screw into the male coupler body 21. Further, since the spring 42 keeps providing the axial stretching force to the protruded elements 44 of the retaining members 43, the conical guiding portions 442 of the protruded elements 44 are pressed against the closed tail ends 3112b in the guiding grooves 3112 and are locked thereto, as shown in FIGS. 2C and 3. At this point, the plug section 211 of the male coupler body 21 is plugged into the second opening 3111 of the engaging section 311 of the female coupler body 31, and the first passage 215 in the male coupler body 21 is communicable with the second passage 313 in the female coupler body 31 via the first opening 2111.

In the above preferred embodiment, the pipe coupler 1 is shown to have two guiding grooves 3112 and three guide posts 3113. However, it is understood the present invention is not limited to the above embodiment. In practical implementation of the present invention, the number of the guiding grooves 3112 and the guide posts 3113 on the female coupler body 31 are corresponding to the number of the retaining members 43 and the guide post grooves 411 on the male coupler body 21.

In the above preferred embodiment, the pipe coupler 1 of the present invention includes a plurality of grooves 2112 and a plurality of receiving sections 2131 provided circumferentially on the outer surface of the male coupler body 21. It is understood, in another embodiment of the present invention, there can be only one groove 2112 and only one receiving section 2113 provided circumferentially on the outer surface of the male coupler body 21.

In the above described preferred embodiment, the connecting hole 414 is provided to penetrate the wall of the sleeve 41. However, the present invention is not limited thereto. In some other embodiments, the connecting hole 414 can be in the form of a bore, a recess, or a hole provided on an inner circumferential surface of the sleeve 41 for the second connecting end 422 of the spring 42 to connect thereto.

With the above structure of the pipe coupler 1 of the present invention, the spring 42 in the male part 2 is stretched forward when the sleeve 41 is rotated, such that the protruded elements 44 on the sleeve 41 move along the guiding grooves 3112 on the female coupler body 31 to the closed tail ends 3112b and be locked thereto, enabling the male and the female part 2, 3 to communicably connect to each other. Meanwhile, a reaction force of the stretched spring 42 enables the formation of a pipe coupler loose-proof and self-locking structure, of which the male part 2 and the female part 3 can be more conveniently and quickly connected together with less effort and can be more easily operated.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A pipe coupler with locking structure, comprising:
a male part including a male coupler body and a sleeve; the male coupler body having two ends being a first opening and a first pipe connection opening, respectively, and internally defining a first passage extending between and communicating with the first opening and the first pipe connection opening; the male coupler body being provided circumferentially on an outer surface with at least one groove extended axially from a rim of the first opening toward the first pipe connection opening, and a spring fitted on around the male coupler body; the sleeve enclosing the male coupler body and the spring therein, such that the spring has an end connected to the outer surface of the male coupler body and another end fixed to the sleeve; the sleeve having at least one through bore formed thereon corresponding to the at least one groove on the male coupler body and having at least one retaining member provided on the outer surface of the sleeve with an end of each retaining member fixed to the sleeve and another free end provided with a protruded element for engaging with the through bore on the sleeve; the protruded element being extendable through the through bore into the groove on the male coupler body to be movably engaged with or disengaged from the groove; and
a female part including a female coupler body having two ends being a second opening and a second pipe connection opening, respectively, and internally defining a second passage extending between and communicating with the second opening and the second pipe connection opening; the female coupler body being provided on an outer surface with at least one guiding groove, which extends slantly from a location adjacent to a rim of the second opening of the female coupler body toward the second pipe connection opening; and
wherein when coupling the male and the female part to each other, the sleeve is rotated for the at least one protruded element on the sleeve to move into and along the at least one guiding groove on the female coupler body and the spring is stretched forward as the sleeve rotates, enabling the male coupler body and the female coupler body to lock with each other.

2. The pipe coupler with locking structure as claimed in claim 1, wherein the male coupler body is provided with at least one receiving section, which is located on an outer circumferential surface of the male coupler body; and the spring having an end connected to the receiving section and another end fixed to an inner wall surface of the sleeve.

3. The pipe coupler with locking structure as claimed in claim 1, wherein the protruded element of the retaining member includes a base portion and a conical guiding portion; the base portion being connected to a free end of the retaining member, and the conical guiding portion being tapered from the base portion toward the groove on the male coupler body to have a gradually decreased outer diameter.

4. The pipe coupler with locking structure as claimed in claim 1, wherein the female coupler body has at least one guide post provided thereon, and the guide post being protruded radially from the outer surface of the female coupler body and located adjacent to the guide groove on the female coupler body.

5. The pipe coupler with locking structure as claimed in claim 4, wherein the sleeve has two ends being a first end and a second end, and is externally provided with at least one guide post groove; the guide post groove having a beginning located at the second end and extending rearward along an axis of the sleeve in an oblique direction to form a slant groove; the guide post groove of the sleeve being used to guide the guide post on the outer surface of the female coupler body to move into and engage with the guide post groove.

6. The pipe coupler with locking structure as claimed in claim 1, wherein the retaining member is in the form of a strip or an elongated piece.

7. The pipe coupler with locking structure as claimed in claim 1, wherein the guiding groove on the female coupler body includes a beginning and a closed tail end; the beginning guiding the protruded element of the retaining member into the guiding groove, and the closed tail end locking the protruded element thereto.

* * * * *